United States Patent [19]

Mitko

[11] Patent Number: 5,193,893
[45] Date of Patent: Mar. 16, 1993

[54] ILLUMINATED VEHICLE HOOD DEFLECTOR

[76] Inventor: Michael A. Mitko, Rte. 4 Box 143B, Burgettstown, Pa. 15021

[21] Appl. No.: 802,205

[22] Filed: Dec. 4, 1991

[51] Int. Cl.⁵ .............................. F21V 8/00; B60Q 1/00
[52] U.S. Cl. ........................................ 362/32; 362/61; 362/80; 362/83.3
[58] Field of Search ..................... 362/61, 80, 26, 27, 362/32, 812, 83.3

[56] References Cited

U.S. PATENT DOCUMENTS

| | | | |
|---|---|---|---|
| 4,646,208 | 2/1987 | Hayashi et al. | 362/80 |
| 4,729,072 | 3/1988 | Oroza | 362/80 |
| 4,745,525 | 5/1988 | Sheehy | 362/82 |
| 4,751,617 | 6/1988 | Ryder et al. | 362/61 |
| 4,977,487 | 12/1990 | Okano | 362/80 |

*Primary Examiner*—Richard R. Cole
*Attorney, Agent, or Firm*—William J. Ruano

[57] ABSTRACT

A vehicle hood deflector for attachment to the hood of the vehicle so as to project above it and an enclosure at the rear of the deflector. The interior of the enclosure is illuminated so as to make visible a sign on the front of the enclosure. A fibre-optic cable has input terminals illuminated by the vehicle headlights and output terminals extending into the enclosure so as to illuminate the sign only by the headlights when illuminated. A modification is to use headlamps in the enclosure energized by the vehicle battery.

1 Claim, 2 Drawing Sheets

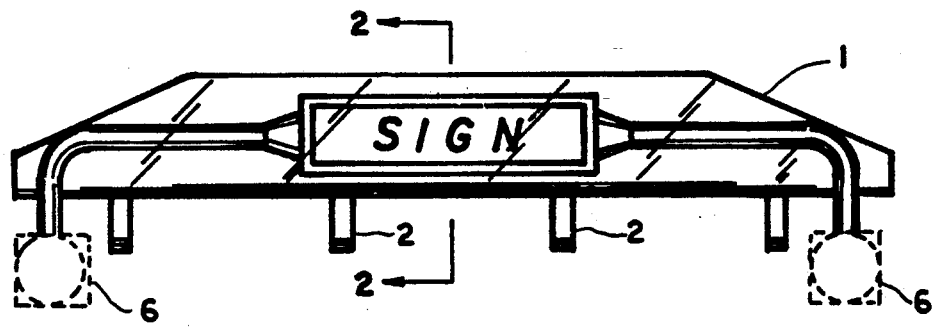
FIG. 1
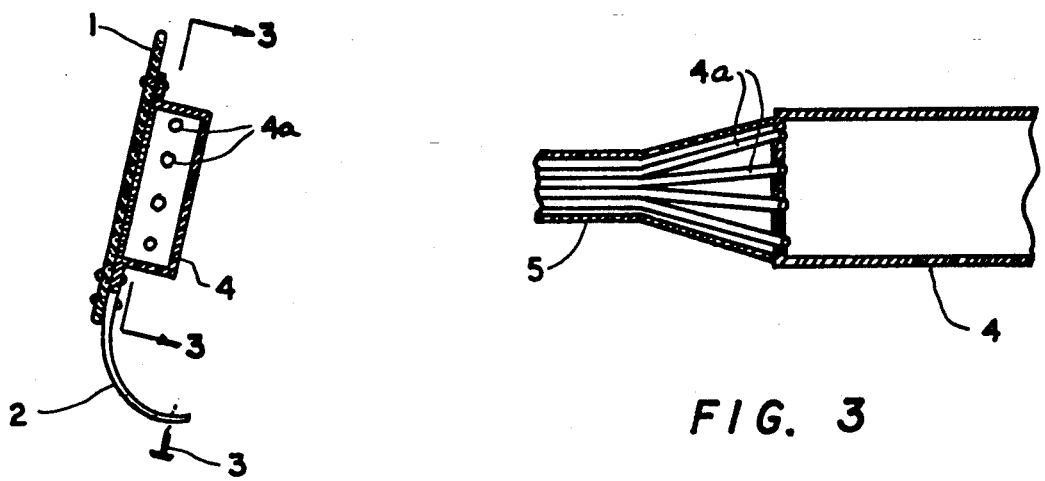
FIG. 2
FIG. 3
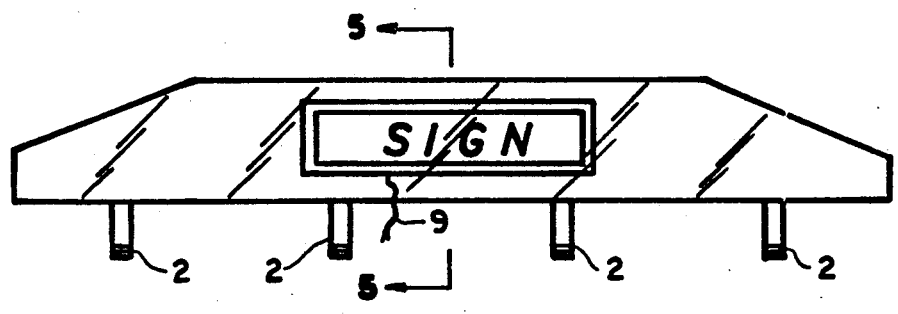
FIG. 4

ILLUMINATED VEHICLE HOOD DEFLECTOR

BACKGROUND OF THE INVENTION

Deflectors for attachment to hoods of vehicles, particularly trucks, to deflect insects or stones from striking the have not been illuminated in the past.

SUMMARY OF THE INVENTION

An object of this invention is to provide illumination to vehicle hood deflectors, also to provide such illumination by fibre-optic cable by having the headlights of the vehicle as the illumination source, therefore eliminating the necessity of terminals connected to the battery of the vehicle.

BRIEF DESCRIPTION OF THE DRAWING

FIG. 1 is a front view which shows an illuminated vehicle deflector embodying fibre-optic cables illuminated by the vehicle headlights;

FIG. 2 is a vertical cross-sectional view taken along line 2—2 of FIG. 1.

FIG. 3 is a cross-sectional view taken along line 3—3 of FIG. 2;

FIG. 4 is a front view of a modification illuminated by electric bulbs;

DESCRIPTION OF THE PREFERRED EMBODIMENTS

Figure 5:
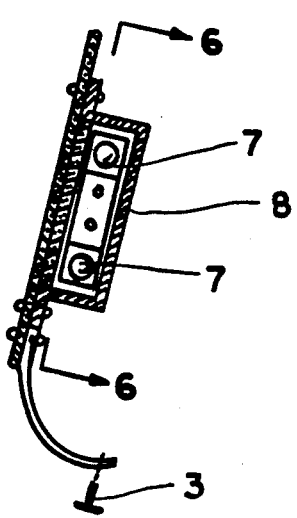
FIG. 5 is a vertical cross-sectional view thereof taken along line 5—5 of FIG. 4.

Referring to FIGS. 1, 2 and 3, numeral 1 denotes a vehicle hood deflector having a support 2 attached to a hood of a vehicle, such as a truck, by screws such as 3. An enclosure 4 is interiorly illuminated by the output terminals 4a of a fibre-optic cable 5 whose input terminals are illuminated by the vehicle headlights 6. The front portion of the enclosure designated SIGN and hood shield are transparent and bear messages.

Figure 6:
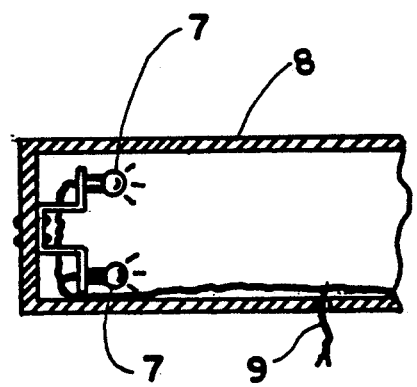
FIG. 6 is a cross-sectional view taken along line 6—6 of FIG. 5.

FIGS. 4, 5 and 6 show a modification illuminated by lamp bulbs 7 in an enclosure 8, which lamp bulbs have lead-ins 9 connected to the vehicle battery.

While I have illustrated and described several embodiments of my invention, it will be understood that these are by way of illustration only and that various changes and modifications are contemplated in my invention within the scope of the following claims:

I claim:

1. For use in combination with a vehicle having a front end, a pair of headlights illuminated by a vehicle battery, and a hood, a hood deflector mounted on and extending across the front of said vehicle beyond said headlights, a sign mounted centrally of said hood deflector, a pair of fibre-optic wire containing cables extending from both ends of said sign to said headlights, said fibre-optic wire containing cables having terminals extending to said headlights, so that when the headlights are illuminated, said fibre-optic wire containing cables will illuminate said sign.

* * * * *